US012746888B2

(12) United States Patent
Amthor

(10) Patent No.: US 12,746,888 B2
(45) Date of Patent: Sep. 29, 2026

(54) CHIP ARCHITECTURE

(71) Applicant: Harman Becker Automotive Systems GmbH, Karlsbad (DE)

(72) Inventor: Peter Amthor, Munich (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 99 days.

(21) Appl. No.: 18/819,712

(22) Filed: Aug. 29, 2024

(65) Prior Publication Data

US 2025/0074355 A1 Mar. 6, 2025

(30) Foreign Application Priority Data

Aug. 30, 2023 (EP) .................................... 23194219

(51) Int. Cl.
*B60R 25/01* (2013.01)
*G06F 21/76* (2013.01)
*G06Q 20/30* (2012.01)

(52) U.S. Cl.
CPC .............. *B60R 25/01* (2013.01); *G06F 21/76* (2013.01); *G06Q 20/308* (2020.05)

(58) Field of Classification Search
CPC .................. B60K 35/231; B60K 35/28; B60K 2360/175; B60R 25/01; G06F 21/76; G06Q 20/308
See application file for complete search history.

(56) References Cited

U.S. PATENT DOCUMENTS 12,515,681 B2 * 1/2026 Piednoel ........... B60W 50/0205
2018/0120561 A1 5/2018 Liu et al.
2020/0018976 A1 * 1/2020 Van Wiemeersch ... B60K 35/23
2021/0318135 A1 10/2021 Chandupatla et al.
2022/0047951 A1 2/2022 Mehdi et al.
2022/0171697 A1 * 6/2022 Moukahal ........... G06F 11/3684
2022/0318047 A1 * 10/2022 Piel ......................... G06F 21/52
2022/0394053 A1 * 12/2022 Sorani ..................... G06F 21/57
2023/0023303 A1 * 1/2023 Shah ....................... G06N 20/00
2023/0367704 A1 * 11/2023 Soukup ............... G06F 11/3688
2024/0345872 A1 * 10/2024 Aho ..................... G06F 11/3013
2024/0404422 A1 * 12/2024 Hiwatashi ............... G06F 3/011

OTHER PUBLICATIONS

Extended European Search Report dated Feb. 26, 2024 for European Patent Application No. 23194219.4 filed Aug. 30, 2023, 9 pgs.

* cited by examiner

*Primary Examiner* — Hai H Huynh
*Assistant Examiner* — Johnny H Hoang
(74) *Attorney, Agent, or Firm* — BROOKS KUSHMAN P.C.

(57) ABSTRACT

A chip architecture for a metaverse incorporated automobile system, comprising: an input module to provide other modules in the chip architecture with one or more inputs; an output module to output data received from other modules in the chip architecture to various actuators; an object module to manage data and structures relating to objects in the metaverse incorporated automobile system, in particular currency, payments, history, or any other item belonging to the metaverse; a view module to present and/or visualize the data and structures of the metaverse incorporated automobile system, and realizes user interactions; a control module to control data and structures of the object module and the view module; and a communication infrastructure to enable exchange of information across the modules.

19 Claims, 3 Drawing Sheets

200

CHIP ARCHITECTURE

CROSS-REFERENCE TO RELATED APPLICATIONS

This application claims priority to EP Application Serial No. 23194219.4 filed Aug. 30, 2023, the disclosure of which is hereby incorporated in its entirety by reference herein.

TECHNICAL FIELD

The present disclosure relates to a chip architecture, in particular, a chip architecture for incorporating metaverse in automobile cabins.

BACKGROUND

The concept of metaverse started to expand in 2021, stemming from the fusion of the words "meta" and "universe", implying an existence that transcends our current universe. This expansion of the metaverse signifies the transition from a primarily physical existence to a predominantly digital life, culminating in a world of the Internet of Things (IoT) that seamlessly blends the virtual and the tangible.

Metaverse unifies a multitude of virtual realities, augmented reality, and the vast realm of the IoT via a single platform or multiple interfaces, to create experiences for gaming, online meetings, education, sales, entertainment, healthcare, and even basic necessities like food, clothing, transportation, and leisure. Virtually everything in the daily lives can integrate with metaverse.

One of the many potential uses of the metaverse is the automobile sector. As the advent of completely autonomous vehicles would be expected in the next decades, metaverse is predicted to drastically shape in-car information and entertainment systems, creating a world where one can superimpose digital content onto the external environment or entirely transform the car windows to depict an alternate universe. Such a revolution could dramatically boost traveling experience of passengers.

SUMMARY

A first aspect of the present disclosure relates to a chip architecture for metaverse incorporated automobile system, comprising: an input module to provide other modules in the chip architecture with one or more inputs; an output module to output data received from other modules in the chip architecture to various actuators (in the system); an object module to manage data and/or structures relating to objects in the metaverse incorporated automobile system, in particular currency, payments, history, or any other item belonging to the metaverse; a view module to present and/or visualize the data/structures of the metaverse incorporated automobile system, and realizes user interactions; a control module to control the data and/or structures of the object module and the view module; and a communication infrastructure to enable exchange of information across the modules. The chip architecture according to the present disclosure provides a safe and secure infrastructure for automotives, in which metaverse use cases or applications are incorporated.

In the present disclosure, a metaverse incorporated automobile system refers to an automobile system which incorporates metaverse in the cabin of the automobile, to provide passengers onboard with metaverse experience. The metaverse refers to a virtual reality space where users can interact with a computer-generated environment and other uses in real time. It is typically visualized as a collective virtual shared space, including the sum of all virtual worlds, augmented reality, and the internet. Metaverse involves creating digital spaces that allow for social interaction, commerce, entertainment, and potentially even new forms of work and education.

Such chip architecture meets the massive real-time rendering, processing, and networking requirements of the metaverse, and enables users to have seamless metaverse experience, such as gaming, shopping, meeting, learning, or the like, in a cockpit, or passenger sits of an automobile.

Preferably, the chip architecture may further comprise a safety module to manage automotive functional safety of the system. The safety module may process and implement a series of protective measures tailored to the automotive domain. These measures are meticulously designed to address potential risks associated with the operation of the chip, such as any malfunction, system failure, or unanticipated behavior which could result in hazardous situations or compromised vehicle operations. The safety module may detect anomalies early enough to prevent or reduce their impact.

More preferably, the safety module may fulfill the ISO 26262 standard. ISO 26262 is an international standard for functional safety of electrical and/or electronic systems that are installed in serial production road vehicles (excluding mopeds), defined by the International Organization for Standardization (ISO). By adhering to the ISO 26262 standard, the chip architecture can ensure the highest levels of safety in automotive electronic systems.

Preferably, the chip architecture may further comprise a security module to minimize and/or eliminate potential cyber-attacks. The security module takes different measures to control the flow of data to minimize or eliminate the impact of a potential cyber-attack.

More preferably, the security module may be designed and implemented to adhere to the requirements of ISO/SAE 21434 standard. ISO/SAE 21434 is a standard for cyber security in motor vehicles. By complying with ISO/SAE 21434, the security module ensures that it identifies potential threats, assesses the risks, and implements robust countermeasures with regard the metaverse incorporated automobile system.

Preferably, the chip architecture may further comprise an artificial intelligence/machine learning (AI/ML) module to support the other modules to carry out specific tasks. The AI/ML module may constantly learn, adapt, and evolve based on the vast data streams the AI/ML module encounters, offering predictive insights, pattern recognition, and real-time decision-making capabilities. The AI/ML module may be kept separate from the other modules, so that in case of any issue (either technical or legal), the AI/ML module can be switched off while still keeping the other modules active, as well as keeping the use cases/applications active.

Preferably, the input module may comprise a gesture recognition submodule to interpret specific hand or body movements; a natural language processing submodule to processes human language; and a feedback submodule to confirm user inputs. During development, each submodule can be developed, tested, and maintained independently, simplifying the development process. Furthermore, as requirements change or grow, new submodules can be added or existing ones can be extended without overhauling the entire input module.

Preferably, the object module may comprise an avatar management submodule to handles data associated with user avatar; a currency management submodule to manage creation, distribution and transaction of currency in the metaverse; and a payment management submodule to manage various payment gateways in the metaverse. Other submodules can be added to the object module as needed according to actual requirements.

Preferably, the communication infrastructure may be a bus system, a matrix, a network or point-to-point communication. The choice of communication concepts depends on specific requirements and scale of interactions, taking into account calculation power, data transfer rate or the like of the system.

Preferably, one or more of the modules are realized as IP cores or blocks, microcontroller units, system on chip or a single chip.

A further aspect of the present disclosure relates to a Central Control Unit (CCU) of a metaverse incorporated automobile system, the CCU comprises the chip architecture as described above. By integrating the chip architecture into the CCU, the core processing capability is centralized, leading to potentially faster data processing and system response. Furthermore, latency can be reduced, and cost can be saved.

A further aspect of the present disclosure relates to a zone of a metaverse incorporated automobile system, the zone comprises the chip architecture as described above. By integrating the chip architecture in a zone of the metaverse incorporated automobile system, high-performance operations tailored to specific needs of that zone can be achieved, ensuring efficient and rapid data processing. The systems can be designed more scalable, easier to upgrade, and simpler to troubleshoot.

A further aspect of the present disclosure relates to a metaverse incorporated in an automobile system, the system comprises the chip architecture as described above.

A further aspect of the present disclosure relates to an automobile, the automobile comprises the chip architecture as described above.

A further aspect of the present disclosure relates to a method of designing a chip architecture for metaverse incorporated automobile system, comprising: providing an input module to provide other modules of the system with one or more inputs; providing an output module to output data received from other modules the chip architecture to various actuators; providing an object module to process all data and structures related to objects in the metaverse incorporated automobile system, in particular currency, payments, history, or any other item belonging to the metaverse; providing a view module to present and/or visualize the data/structures of the metaverse incorporated automobile system, and realizes any user interaction; providing a control module to control data or structures of the object module and the view module; and providing a communication infrastructure to enable exchange of information across the modules.

DETAILED DESCRIPTION

In the following description, various embodiments of the present disclosure will be presented. It should be understood that these embodiments are provided by way of example only and are not intended to be limiting. The embodiments described herein can be combined in any suitable manner. The scope of the present disclosure is defined in the independent claims, and all modifications and equivalents that fall within the scope of the claims are intended to be embraced therein.

Figure 1:
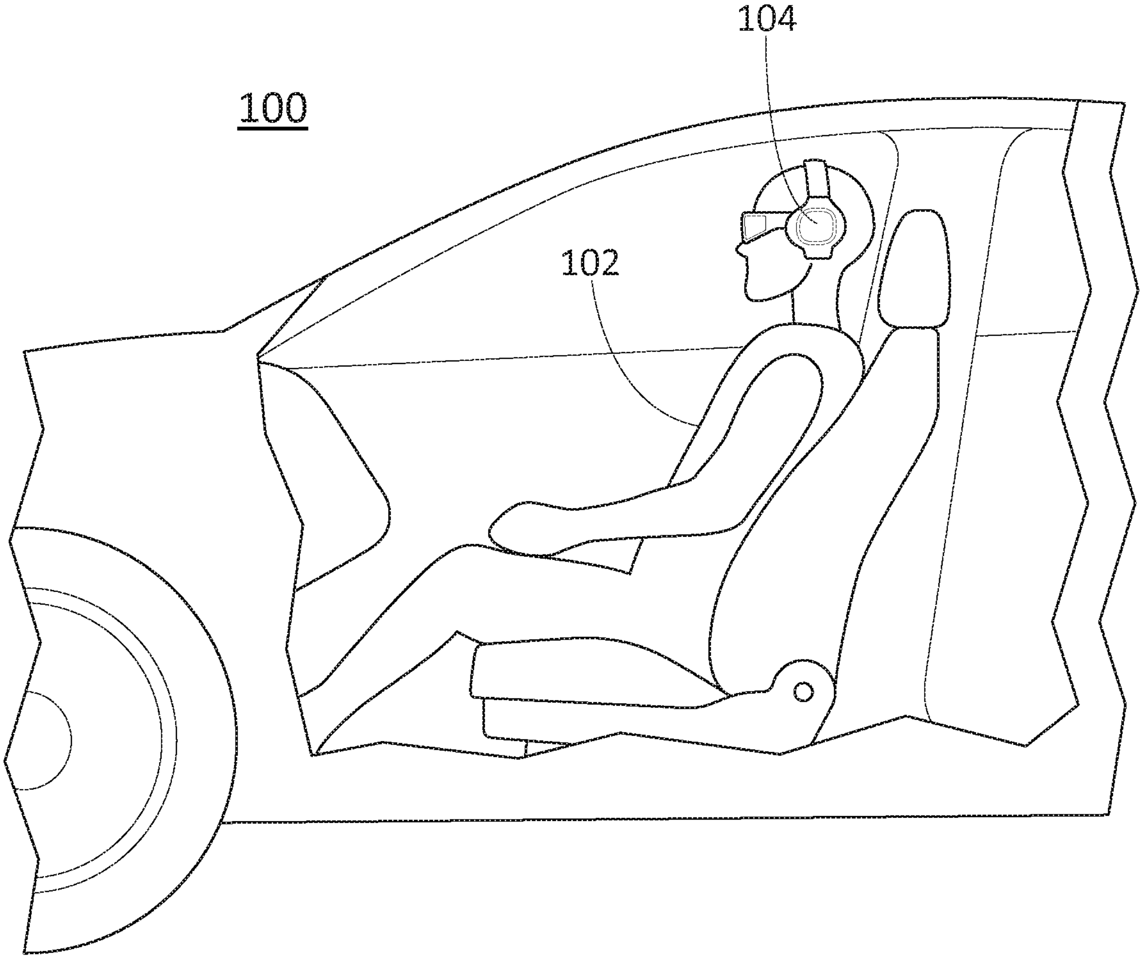
FIG. 1 is an exemplary view of a metaverse system incorporated in an automobile cabin.

FIG. 1 depicts an exemplary view of metaverse incorporated automobile system 100. The system 100 integrates metaverse into the interior space (cabin) of an automobile. With the rapid progression and proliferation of autonomous driving technologies, a passenger 102 in a self-driving vehicle is expected to be significantly liberated from the responsibilities and constraints of manual driving. This transformation entails that vehicles will no longer serve merely as transportation tools that transport individuals or goods from one location to another. As passengers find themselves with an abundance of free time while onboard, the role of a vehicle also evolves in that the vehicle becomes a new space of activities. Such transformation will turn vehicles into versatile spaces, allowing passengers to enjoy a variety of activities, such as entertainment, working or learning. Consequently, the future landscape of mobility is not just about getting from point A to B, but about maximizing the experience during the journey.

With the rise of metaverse, it is anticipated that in-car information and entertainment systems will be drastically shaped. As the boundaries between the digital and physical worlds blur, vehicles could become an extension of this interconnected universe. For example, a windshield with augmented reality features can offer immersive navigation to the passenger, where directions are overlaid directly onto the road. Also, the windshield can provide the passenger 102 with virtual reality experiences such as joining a meeting from the vehicle, watching a live concert, or engaging in an online gaming. This fusion of the metaverse with vehicular systems can provide a more engaging and multi-dimensional travel experience.

In some embodiments, the metaverse incorporated automobile system 100 may include a virtual reality or augmented reality headset 104 that the passenger 102 can wear. Once inside the metaverse, the passenger 102 could watch movies in a virtual cinema, play immersive games, attend virtual meetings, or learn new things in a virtual environment. This essentially transforms the vehicle into a moving extension of homes, offices and schools, offering endless possibilities for productive or entertaining uses of time during travelling.

In some embodiments, the metaverse incorporated automobile system 100 may function as a virtual co-pilot, which is an artificial intelligence powered (AI-powered) entity that provides real-time guidance and information about a journey. The virtual co-pilot may keep passengers updated on routes, estimated arrival time, and any adjustments made due to traffic or road conditions. It may also provide updates on the status of the vehicle, including fuel or battery levels, maintenance needs, etc. The virtual co-pilot may interact with the passenger 102 via voice commands or through a virtual interface in the metaverse.

In some embodiments, passengers traveling in separate vehicles can share a common metaverse environment to interact and communicate with each other during the journey. The passengers may play virtual games together, watch the same movie in a shared virtual cinema, or simply chat in a more immersive way than a phone call would allow.

In some embodiments, automakers may create virtual showrooms within the metaverse, allowing potential customers to explore and customize vehicles in a 3D environment. The customers may even take virtual test drives, experiencing the vehicle's handling, interior features or the like, all within the metaverse. This may revolutionize the vehicle shopping experience, making it more immersive and convenient.

It goes without saying that the applications of incorporating metaverse in automobile systems are non-exhaustive, which are not limited to the embodiments listed above. While some potential uses are mentioned, the convergence of metaverse and automobile opens the door to endless possibilities. Collaborations between automotive engineers and metaverse developers can drive both industries forward in ways that enrich the user experience and redefine the very concept of travel.

Figure 2:
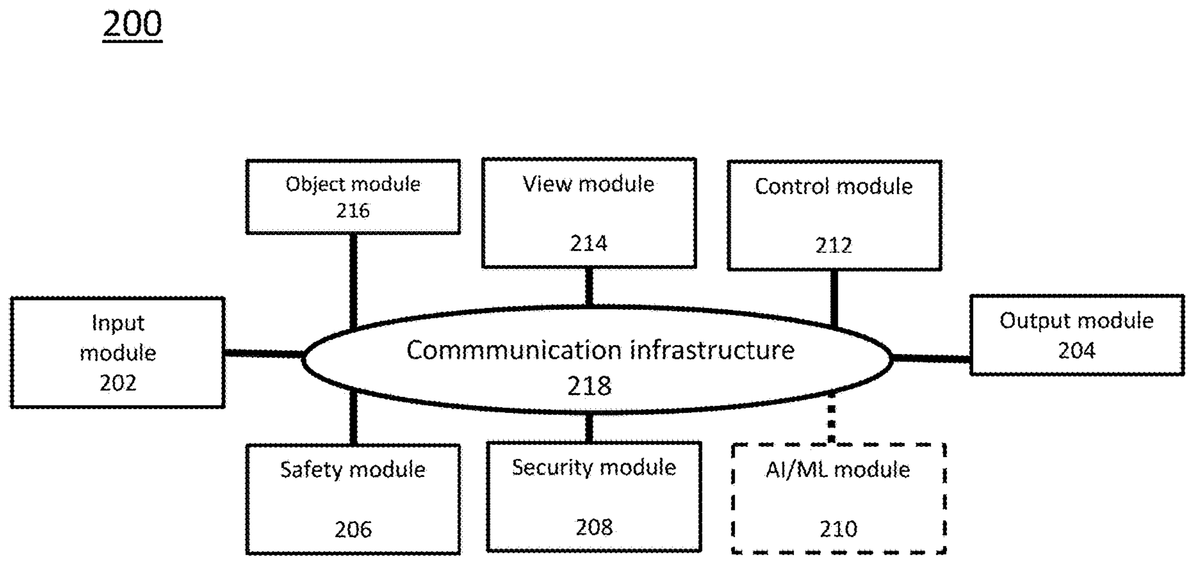
FIG. 2 is a chip architecture for incorporating metaverse in automobile cabins according to an embodiment of the present disclosure.

To incorporate metaverse in automobile cabins, specific hardware components are needed. FIG. 2 provides an overview of a chip architecture 200 for a metaverse incorporated automobile system according to an embodiment of the present disclosure. The chip architecture includes well-defined hardware modules as a basis to incorporate metaverse in the automobile cabins.

In the chip architecture 200, the hardware module input IF 202 represents an input interface for the system 100. The module input IF 202 is configured to input data into a virtual, augmented, or mixed reality environments of the metaverse. The module 202 takes all inputs from the automobile and provides them via a communication infrastructure 218 to the other modules in the chip architecture. The inputs can be for example from motion sensors, haptic sensors, voice recognition sensors, eye-tracking sensors, brain-computer interfaces, cameras, radars, lidars, or the like. The module 202 may also include submodules such as gesture recognition submodule, which interprets specific hand or body movements; natural language processing submodule, which processes human language and enabling users to converse with virtual entity of the metaverse using speech, or feedback submodules, which confirms user inputs, ensuring that the system has actually received the user's intended actions.

The chip architecture further includes an object module 216. The object module 216 is configured to manage, analyze and process diverse data structures associated with virtual objects in the metaverse, such as avatars, currency, payments, history, or any other item belonging to the metaverse, to ensure the integrity and consistency of the retrieved data. In some embodiments, the object module includes an avatar management submodule, which handles data associated with user avatars; a currency management submodule, which manages the creation, distribution and transaction of currency; and a payment management submodule, which manages various payment gateways relating to purchasing of virtual goods or services.

A view module 214 is provided in the chip architecture to present and visualize data or object from the object module 216 to a user. The primary function of the view module 214 may be to render avatars, currency symbols, or other virtual items and entities in a visually appealing manner, adapting to the user's environment, preferences, and device capabilities. The view module 214 may also allow users to interact with the visual representations. It may perform real-time updates to reflect changes in the state of the objections, or allow users to customize how they view certain elements, giving users control over aspects such as layout, information density, color scheme, etc.

The chip architecture 200 may further include a control module 212 to control the data or structures of the object module and the view module. The control module 212 processes user inputs, such as commands, gestures, or voice inputs, translating them into actions within the metaverse, like moving an avatar, initiating transactions, or customizing settings. The control module 212 may take inputs from the input IF module 202 for its control procedures and provides output data for an output IF module 204 based on the outcome of the control procedures.

The chip architecture may further comprise an output IF module 204. The output IF module 204 outputs the data received through the communication infrastructure from other modules and sends it to various actuators, such as Heating, Ventilation, and Air conditioning (HVAC), brakes or the like, or user interfaces, such as the In-Vehicle Infotainment (IVI), cluster or any other (data) receiver in the automobile network. Once data is received via the communication infrastructure 218 from other interconnected modules, the output module 204 outputs it to a variety of actuators and user interfaces designed for specific functions. For instance, it might relay essential commands to HVAC systems, ensuring the desired cabin temperature is maintained, or to braking systems, enabling responsive control and safety.

In some embodiments, the chip architecture 200 may further comprise a safety module 206. The safety module 206 may be provided to oversee and manage automotive functional safety considerations. The safety module 206 may process and implement a series of protective measures tailored to the automotive domain. These measures are meticulously designed to address potential risks associated with the chip's operation. For instance, any malfunction, system failure, or unanticipated behavior of the chip architecture 200 could result in hazardous situations or compromised vehicle operations. The safety module 206 may detect anomalies early on, and either prevent or reduce their impact. Several layers of safety protocols might be embedded within this module. These can range from continuous system health checks, monitoring of data integrity, and ensuring the synchronization of processes, to more advanced measures such as failover mechanisms, redundancy provisions, and emergency response actions.

In some preferred embodiments, the safety module 206 may be designed and implemented to adhere to the requirements of ISO 26262 standard. ISO 26262 is an international standard that addresses the functional safety of electrical and electronic systems in production automobiles.

In complying with ISO 26262, the safety module 206 undergoes rigorous testing, validation, and certification processes. This involves various stages, from the conceptualization of its design to its integration into the larger system, ensuring its resilience against potential hazards and malfunctions. By adhering to the ISO 26262 standard, the chip architecture can ensure the highest levels of safety in automotive electronic systems. This entails not just detecting and managing irregularities or faults, but also having predefined mechanisms and strategies in place to counteract unforeseen events or failures. For instance, the module would incorporate fail-safe mechanisms, redundancy protocols, and self-check capabilities, all aligned with the standard's requirements. Furthermore, to maintain compliance, the performance of the safety module would be periodically reviewed, tested, and updated as necessary. Any modifications, enhancements, or updates to the module would also be subjected to a thorough safety assessment, ensuring that the module consistently aligns with the evolving demands of the ISO 26262 standard.

In some embodiments, the chip architecture 200 may further comprise a security module 208. The security module 208 controls the flow of data to minimize or eliminate the impact of a potential cyber-attack. The security module 208 may comprise a multi-layered security mechanism to fortify against potential cyber threats. For example, advanced intrusion detection systems are used to monitor the network traffic against any malicious patterns. Data, both in transit and at rest, is encrypted using the latest cryptographic standards, such as Advanced Encryption Standard (AES), Elliptic-curve cryptography (ECC), Digital Signature Algorithm (DSA) or the like, to safeguard user information and in-world transactions.

In some preferred embodiments, the security module 208 may be designed and implemented to adhere to the requirements of ISO/SAE 21434 standard. This international standard ISO/SAE 21434 defines the comprehensive requirements and guidelines for cybersecurity risk management pertaining to road vehicles and their interfaces. By complying with ISO/SAE 21434, the security module 208 ensures that it identifies potential threats, assesses the risks, and implements robust countermeasures with regard the metaverse incorporated automobile system.

In some preferred embodiments, the chip architecture may further comprise a machine learning (ML) module 210. The AI/ML module 210 may support other modules to carry out specific tasks. It may constantly learn, adapt, and evolve based on the vast data streams it encounters, offering predictive insights, pattern recognition, and real-time decision-making capabilities. For example, the AI/ML module 210 may refine avatar interactions based on user preferences to optimizing virtual economies or enhance the realism of simulations. The AI/ML module enhances the user experience and drives the continuous evolution of the metaverse, ensuring it remains adaptive, immersive, and engaging for all users. The AI/ML module may be kept separated from the other modules, so that in case of any issue (either technical or legal), the AI/ML module can be switched off while still keeping the other modules active, as well as keeping the use cases/applications active.

The communication infrastructure 218 of the chip architecture 200 enables the exchange of information (data) across the modules. For example, the communication infrastructure 218 can transfer user commands to avatars in real-time, in an efficient, and secure way. The communication infrastructure 218 may be designed to handle varying data loads, ensuring latency-free experiences. It may also incorporate security protocols to protect user data and transactions, safeguarding against potential cyber threats. The communication infrastructure 218 may be kept versatile, allowing the communication infrastructure 218 to adapt to various architectural designs and technological demands. Depending on the specific requirements and scale of interactions, the communication infrastructure 218 may be realized through various communication concepts. The communication infrastructure 218 may manifest as a bus system, wherein multiple modules and systems share a single communication line, ensuring a simplified yet effective data transfer mechanism. Alternatively, the communication infrastructure 218 may be designed as a matrix, allowing for more complex data routing and multi-dimensional connectivity. Still alternatively, for broader and more distributed scenarios, it may be designed as a network, facilitating interconnectivity across disparate metaverse regions or platforms. Additionally, point-to-point communication may be used in cases where high-speed data transfer is required.

In the present disclosure, each module may be kept as flexible and open as possible. For example, one or more modules may be realized as hardware IP cores or blocks. IP cores or blocks are reusable units of logic or functionality that can be integrated seamlessly into different designs, allowing for optimized, dedicated functions and high-speed performance. Such a realization is particularly beneficial for tasks that demand real-time responses or heavy computational power. Alternatively, one or more modules may be realized as a Microcontroller Unit (MCU). MCUs are compact, integrated systems that come with their own memory, processor, and I/O peripherals. MCUs are particularly suitable for applications that need both control and moderate computational capabilities, balancing efficiency with versatility. The one or more modules may also be realized as System on Chip (SoC). SoCs integrate all components of a computer or other electronic system into a single chip. This provides immense power, as the SoC encapsulates multiple functionalities and components, like processors, memory, and more, into one unified system, making the SoC ideal for more complex tasks and multi-faceted operations. Alternatively, one or more modules may be realized as a standalone computer chip. Such realization may maximize computational capacity, flexibility, and scalability, and ensure high performance. The SoC is especially suitable for tasks that demand extensive processing resources, multitasking, and intricate operations. In essence, by allowing each module to be realized diversely, maximum flexibility in architecture can be ensured.

Figure 3:
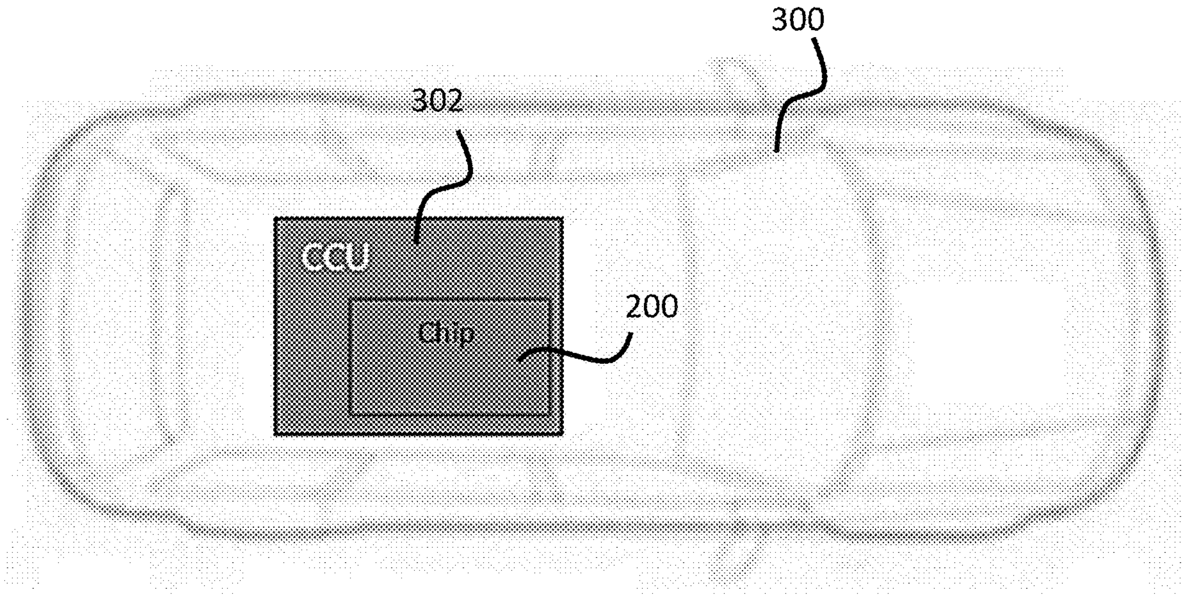
FIG. 3 is a chip for incorporating metaverse in automobile cabins as part of a central control unit of the automobile according to an embodiment of the present disclosure.
Figure 4:
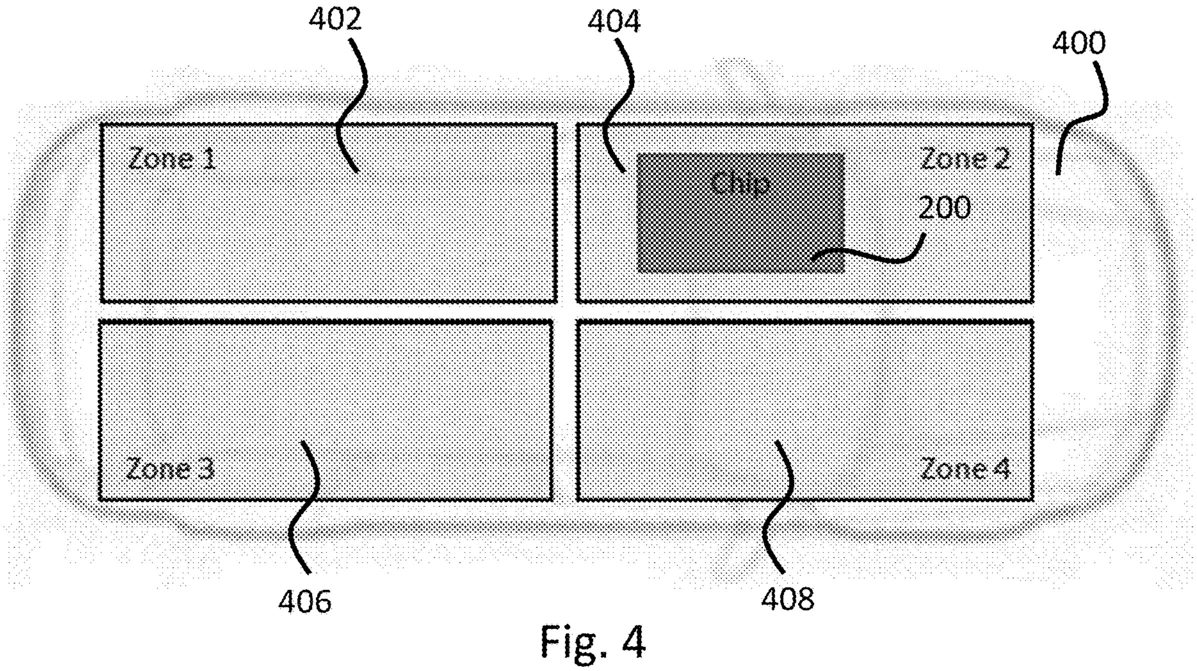
FIG. 4 is a chip for incorporating metaverse in automobile cabins as part of a zone of the automobile according to an embodiment of the present disclosure.

In the present disclosure, based on specific requirements, the chip architecture 200 may be realized as a part of a Central Control Unit (CCU) 302 of an automobile 300, as depicted in FIG. 3. Alternatively, the chip the chip architecture 200 may be realized as a part of a zone in an automobile, as depicted in FIG. 4.

As can be seen from FIG. 3, the chip architecture 200 is integrated into a CCU of an automobile 400. In this configuration, the CCU can provide seamless communication, data processing, and control over various subsystems. Alternatively, as shown in FIG. 4, the chip architecture 200 may be integrated into a zone 404 of an automobile 400. Generally, different regions or zones of an automobile house respective electronic components, reducing the need for extensive wiring and centralized control. Within such a zone-structure, the chip architecture 200 can be realized as the central processing unit of that specific zone, fulfilling specific requirements of that region.

What is claimed is:

1. A chip architecture implemented on a single chip for a metaverse incorporated automobile system, comprising:
- an input module to provide other modules in the chip architecture with one or more inputs;
- an output module to output data received from other modules in the chip architecture to various actuators;
- an object module to manage data and structures relating to objects in the metaverse incorporated automobile system corresponding to at least currency, payments, and history belonging to the metaverse;
- a view module to at least one of present and visualize the output data and structures of the metaverse incorporated automobile system, and realizes user interactions;

a control module to control data and structures of the object module and the view module; and a communication infrastructure to enable exchange of information across the input module, the output module, the view module, the control module, and the other modules.

2. The chip architecture according to claim 1, further comprising:

a safety module to manage automotive functional safety of the system.

3. The chip architecture according to claim 2, wherein the safety module fulfills ISO 26262 standard.

4. The chip architecture according to claim 1 further comprising:

a security module to at least one of minimize and eliminate potential cyber-attacks.

5. The chip architecture according to claim 4, wherein the security module fulfills ISO-SAE 21434 standard.

6. The chip architecture according to claim 1 further comprising:

an artificial intelligence or machine learning module to support the other modules to carry out specific tasks.

7. The chip architecture according to claim 1, wherein the input module comprises:

a gesture recognition submodule to interpret specific hand or body movements;

a natural language processing submodule to processes human language; and a feedback submodule to confirm user inputs.

8. The chip architecture according to claim 1, wherein object module comprises:

an avatar management submodule to handle data associated with user avatar;

a currency management submodule to manage creation, distribution and transaction of currency in the metaverse; and a payment management submodule to manage various payment gateways in the metaverse.

9. The chip architecture according to claim 1, wherein the communication infrastructure is a bus system, a matrix, a network or point-to-point communication.

10. A Central Control Unit (CCU) of a metaverse incorporated automobile system, comprising the chip architecture according to claim 1.

11. A zone of a metaverse incorporated automobile system, comprising the chip architecture according to claim 1.

12. A metaverse incorporated automobile system, comprising the chip architecture according to claim 1.

13. An automobile, comprising the chip architecture according to claim 1.

14. A method of designing a chip architecture for metaverse incorporated automobile system, comprising:

providing an input module to provide other modules in the chip architecture with one or more inputs, wherein the input module comprises:

a gesture recognition submodule to interpret specific hand or body movements;

a natural language processing submodule to processes human language; and a feedback submodule to confirm user inputs;

providing an output module to output data received from other modules in the chip architecture to various actuators;

providing an object module to manage data and/or structures relating to objects in the metaverse incorporated automobile system, in particular currency, payments, history, or any other item belonging to the metaverse, wherein object module comprises:

an avatar management submodule to handle data associated with user avatar;

a currency management submodule to manage creation, distribution and transaction of currency in the metaverse; and a payment management submodule to manage various payment gateways in the metaverse;

providing a view module to present and/or visualize the output data and/or structures of the metaverse incorporated automobile system, and realizes user interactions;

providing a control module to control data or structures of the object module and the view module; and providing a communication infrastructure to enable exchange of information across the modules.

15. The method of claim 14, further comprising:

managing via a safety module, an automotive functional safety of the system.

16. The method of claim 15, wherein the safety module fulfills ISO 26262 standard.

17. The method of claim 14 further comprising:

performing, via a security module, at least one of minimizing and eliminating potential cyber-attacks.

18. The method of claim 17, wherein the security module fulfills ISO-SAE 21434 standard.

19. A chip architecture for a metaverse incorporated automobile system, comprising:

an input module to provide other modules in the chip architecture with one or more inputs;

an output module to output data received from other modules in the chip architecture to various actuators;

an object module to manage data and structures relating to objects in the metaverse incorporated automobile system corresponding to at least currency, payments, and history belonging to the metaverse;

a view module to at least one of present and visualize the data and structures of the metaverse incorporated automobile system, and realizes user interactions;

a control module to control data and structures of the object module and the view module; and a communication infrastructure to enable exchange of information across the input module, the output module, the view module, the control module, and the other modules, wherein one or more of the input module, the output module, the object module, the view module, and the control module are implemented on a single chip.

* * * * *